United States Patent [19]
Konak et al.

[11] Patent Number: 4,869,830
[45] Date of Patent: Sep. 26, 1989

[54] METHOD FOR TREATING A PRODUCED HYDROCARBON-CONTAINING FLUID

[75] Inventors: A. Riza Konak; Michael K. Bridle, both of Calgary, Canada

[73] Assignee: Exxon Production Research Company, Houston, Tex.

[21] Appl. No.: 140,844

[22] Filed: Jan. 5, 1988

Related U.S. Application Data

[62] Division of Ser. No. 864,635, May 16, 1986, abandoned.

[51] Int. Cl.⁴ .............................................. B01D 17/04
[52] U.S. Cl. .................................. 210/708; 210/774; 210/790; 210/799; 210/806; 208/187
[58] Field of Search ............... 210/708, 774, 790, 799, 210/805, 806, 718, 737; 208/187, 391

[56] References Cited

U.S. PATENT DOCUMENTS

| | | | |
|---|---|---|---|
| 938,779 | 11/1909 | Morrison | 210/737 |
| 2,765,917 | 10/1956 | Francis, Jr. | 210/708 |
| 2,789,083 | 4/1957 | Hardy | 210/708 X |
| 2,968,603 | 1/1961 | Coulson | 208/391 |
| 3,256,997 | 6/1966 | Pall et al. | 208/187 |
| 4,343,323 | 8/1982 | Kessick et al. | 210/708 X |
| 4,382,852 | 5/1983 | McCoy et al. | 210/708 X |
| 4,392,944 | 7/1983 | Kessick | 210/708 X |
| 4,424,113 | 1/1984 | Mitchell | 208/391 |
| 4,466,885 | 8/1984 | Ronden | 210/708 X |
| 4,518,505 | 5/1985 | Lim et al. | 210/712 |

Primary Examiner—Tom Wyse
Attorney, Agent, or Firm—Herbert E. O'Niell

[57] ABSTRACT

A method and system for reducing the oil concentration of a produced, hydrocarbon-containing fluid to no more than about 10 ppm and softening the deoiled fluid to reduce scale-forming constituents. The method and system are capable of treating fluids having temperatures within the range from approximately 120° C. to approximately 160° C., without the need for cooling the fluid to perform either the deoiling step or the softening step. In a preferred embodiment, the deoiling step is performed by first filtering the hot fluid in a first set of coalescing filters and then in a second, identical set of coalescing filters, and the softening step is performed in a thermal softening unit wherein steam is directly sparged into the deoiled fluid in a reaction zone under pressure sufficient to prevent boiling at the reaction zone temperature.

13 Claims, 1 Drawing Sheet

METHOD FOR TREATING A PRODUCED HYDROCARBON-CONTAINING FLUID

This application is a divisional, of co-pending application Ser. No. 864,635, filed May 16, 1986 now abandoned.

FIELD OF THE INVENTION

The invention relates generally to methods and apparatus for treating produced, hydrocarbon-containing fluids. More particularly, the invention relates to methods and apparatus for reducing the oil concentration of produced, hydrocarbon-containing fluids and softening the resulting deoiled fluids to reduce scale-forming constituents.

BACKGROUND OF THE INVENTION

There are a variety of hydrocarbon extraction processes for producing hydrocarbon-containing fluids. Typically, the produced fluids are emulsions including both hydrocarbons and "hard water," where the phrase "hard water" denotes water having impurities that form insoluble precipitates known as "scale" when the hard water is heated. It is desirable to separate the produced, hydrocarbon-containing fluids into a predominantly liquid hydrocarbon portion, a predominantly liquid water portion, and a gaseous portion. The predominantly liquid water portion will typically include hard water.

For many applications, it is desirable to "soften" the liquid water portion by decreasing substantially the concentration of impurities (generally, these are divalent metal ions) in the hard water which can form insoluble precipitates. One suitable technique for softening hard water is the thermal softening process described in U.S. Pat. No. 4,518,505, issued May 21, 1985 to G. B. Lim and A. R. Konak, and assigned to Exxon Production Research Company. A system for processing a fluid in accordance with the thermal softening process disclosed in such patent will be referred to herein as a "thermal softening unit."

For many applications, it is desirable not only to soften the liquid water portion of the produced fluid but to reduce substantially the concentration of hydrocarbons in the liquid water portion. The concentration of hydrocarbons in a fluid will hereinafter be referred to as the "oil concentration" of the fluid and will be quantified in units of parts per million ("ppm").

In one important example, a bitumen-containing emulsion is extracted from a tar sand formation using a conventional cyclic steam stimulation process. Steam, typically having quality of about 80%, is injected into the formation to mobilize bitumen which is subsequently produced with the steam condensate as emulsion. This emulsion typically contains 3 to 4 volumes of water for each volume of bitumen and its temperature is approximately 140° C. once the steady state conditions are established. The emulsion is typically first cooled to around 125° C. to recover some of its heat and raise boiler feedwater temperature from approximately 100° C. to approximately 133° C. It is then separated in an inlet separator into its gas, oil and water components at about 125° C. The inlet separator thus acts as an initial separator. Also the inlet separator takes up the production surges that frequently occur in this type of steam stimulation operation. Most of the free water (up to 75% or more) is separated from the hydrocarbon and gas components by the inlet separator. The bitumen along with the remaining liquid water is separated into approximately equal streams for further cooling and treatment at two or more free and emulsified water removal units. Bitumen with a bottom sediment and water specification (BS & W specification) of ½% or less emerges from these units for blending with diluent prior to pipelining. A water stream emerges from each free water removal unit at around 110° C. and is further cooled and combined with the water stream emerging from the inlet separator, and the combined stream is further cooled prior to storage and further oil separation at atmospheric pressure. The oil content of the combined water stream is typically approximately 1% to 5%. Some of the oil is skimmed off in a skim tank and is recycled. The water, at 80°-90° C., is then further treated by induced gas floatation and coalescing filters to reduce its oil concentration to 10 ppm or less before the deoiled water is softened in a hot lime treater (HLT) and then filtered by anthracite filters. Remaining traces of hardness are removed in a set of ion exchange units and the deoiled, softened water is then stored in a boiler feedwater tank. Deoiled, softened water from this tank is heat exchanged with the inlet production to recover some of the heat as mentioned earlier, and then is fed to a boiler for steam generation purposes. Also make up fresh water used in the HLT is heated up using a portion of the heat recovered from the inlet production.

It is emphasized that the conventional system described above, and similar conventional systems, employ heat exchangers to extract heat from the produced fluid either before the fluid is separated into its components or after various components have been separated from it (or both before and after separation) for the purpose of transferring the extracted heat to boiler feed water while reducing the fluid temperature to about 80°-90° C., to facilitate deoiling at about 80°-90° C. and atmospheric pressure.

The conventional system described above has several drawbacks. First, the produced fluid, or the predominantly liquid water component thereof, needs to be cooled down and heated up again to deoil and soften it. Second, not all the heat can be recovered and used in the system and excess heat is dissipated to atmosphere. Third, the steam generation facilities are coupled with bitumen production facilities through the heat exchanger that heats up the boiler feedwater and cools down the inlet production. Therefore when one facility is upset, the other is affected. Fourth, the water reuse system is complex and entails large capital and operating costs.

SUMMARY OF THE INVENTION

The invention is a method and system for treating a produced, hydrocarbon-containing fluid having temperature greater than 100° C. within typically the range of approximately 120° C. to approximately 160° C. The method includes the steps of reducing the oil concentration of the fluid to no more than approximately 10 ppm, and softening the deoiled fluid in a thermal softening unit. In a preferred embodiment, the deoiled fluid will not only be softened in the thermal softening unit, but will also undergo filtration in the thermal softening unit to reduce the amount of associated solid impurities and will thereafter be processed in a steam generation unit. This embodiment is useful, for example, where the produced fluid is an emulsion containing hard water and bitumen produced as a result of cyclic steam stimulation of a tar sand formation. The steam produced in the steam generation unit may be injected into the formation for stimulation purposes.

The inventive system is capable of performing the method of the invention, and includes a hot deoiling unit and a thermal softening unit. The hot deoiling unit and thermal softening unit are each capable of treating produced, hydrocarbon-containing fluids having temperature within the range of approximately 120° C. to approximately 160° C.

The inventive method has the following advantage over conventional methods for treating produced fluids having temperature in the approximate range of 120° C.–160° C. The invention eliminates the need to employ heat exchangers for reducing the temperature of the produced fluids and for attempting to transfer heat from the produced fluids to recycle water. Elimination of such heat exchangers improves the energy efficiency of the overall fluid treatment and water recycling process, and simplifies the process by reducing equipment requirements.

The inventive method also provides greater flexibility by decoupling the steam generation unit from the portion of the system in which hydrocarbons are separated from the raw produced fluids, in contrast with coupling them through heat exchanger units. Overall, performance of the inventive method should reduce capital and operating costs, reduce chemical usage and handling, and increase energy efficiency relative to conventional produced fluid treatment processes.

DETAILED DESCRIPTION OF THE PREFERRED EMBODIMENTS

Figure 1:
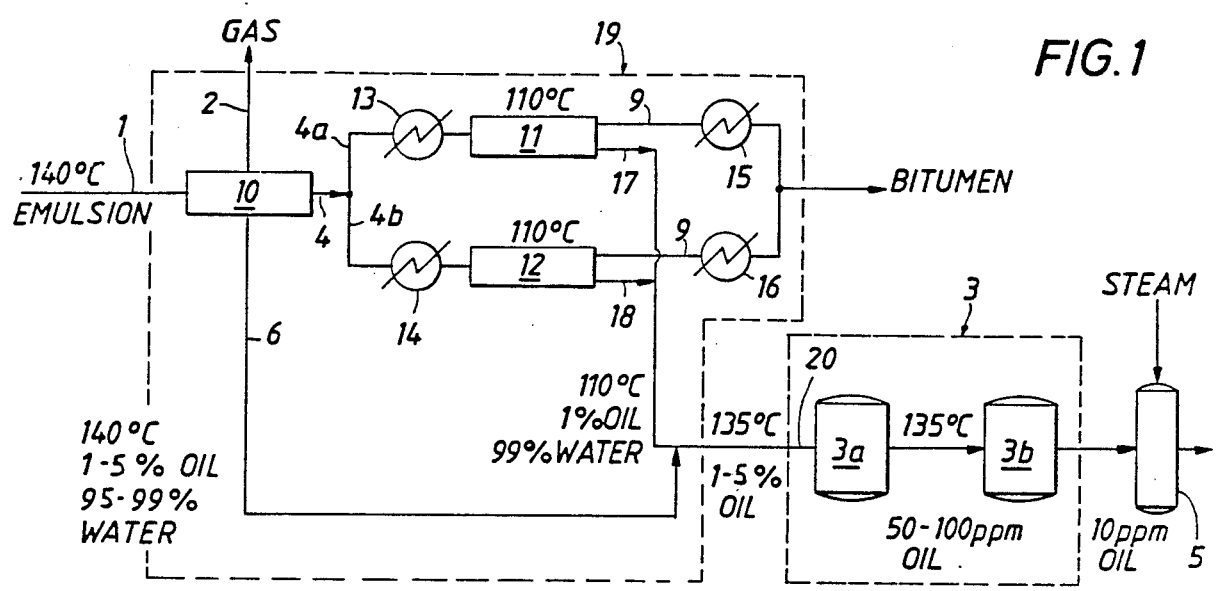
FIG. 1 is a schematic diagram of a preferred embodiment of the inventive system.

The invention will be described with reference to FIG. 1, which schematically shows a preferred embodiment of the inventive system. A hot, hydrocarbon-containing, produced fluid (identified by numeral 1) flows into inlet separator 10. The output of separator 10 includes three portions: a predominantly gaseous portion 2; a portion (identified by numeral 4) which consists predominantly of liquid hydrocarbons; and a portion (identified by numeral 6) which consists predominantly of liquid water.

The inventive system is capable of treating produced, hydrocarbon-containing fluids having temperature within the range from approximately 120° C. to approximately 160° C. For purposes of describing FIG. 1, fluid 1 will be described as an emulsion, having temperature about 140° C., of bitumen and steam condensate (hard water) produced as a result of cyclic steam stimulation of a tar sand formation, though the FIG. 1 system or variations of the system, may be used to treat other produced, hydrocarbon-containing fluids having temperature in the described range. For example, hydrocarbon-containing fluids may be produced as a result of application of any of a variety of thermal processes, such as steam flooding, fire flooding, as well as steam stimulation, to subterranean formation. Typically, such a bitumen steam condensate emulsion will have 3 to 4 volumes of condensate for each volume of bitumen. Inlet separator 10 acts as an initial separator and also takes up production surges that commonly occur in hydrocarbon extraction operations. Inlet separator 10 may be selected from those commercially available which are capable of separating fluid into portions 2, 4, and 6 in such a manner that the temperature of portions 2, 4 and 6 is not significantly reduced relative to the temperature of fluid 1, and so that portions 4 and 6 have sufficiently high pressure so that they may be maintained in liquid form for subsequent processing. Inlet separator 10 will preferably have sufficiently large capacity so that the composition of portion 6 will be predominantly liquid water, with an oil concentration of about 1% at most times during operation of the system, and with occasional surges in oil concentration up to no more than about 5%.

Portion 4 is divided into subportions 4a and 4b for subsequent processing to separate the bitumen components from the oily water component thereof. Although portion 4 is shown to be split into two subportions in FIG. 1, it is within the scope of the invention to split portion 4 into any number of subportions, or to refrain from splitting portion 4 at all prior to subsequent treatment. Subportions 4a and 4b are cooled by heat exchangers 13 and 14, respectively, to about 110° C. for treatment in water removal units 11 and 12. Bitumen 9 emerges from each water removal unit and passes through heat exchangers 15 and 16. Also, water stream 17 emerges from water removal unit 11 and water stream 18 emerges from water removal unit 12. Streams 17 and 18 each have temperature approximately equal to 110° C. and include hard water with an oil concentration of approximately 1%. Streams 17 and 18 are combined with portion 6 to form combined stream 20. Combined stream 20 has temperature approximately equal to 135° C. and has oil concentration in the range 1–5%. It should be recognized that the temperature of combined stream 20 will depend on the temperature of fluid 1, and that of water streams 17 and 18, as well as on the relative volumes of portion 6 and streams 17 and 18. However, in all embodiments of the invention, the temperature of combined stream 20 will be within the approximate range 120° C.–160° C.

Combined stream 20 is processed in hot deoiling unit 3 to reduce its oil concentration to no more than approximately 10 ppm. In the embodiment shown in FIG. 1, hot deoiling unit 3 includes two sets of coalescing filters, 3a and 3b. Set 3a of coalescing filters reduces the oil concentration of combined stream 20 to approximately 50–100 ppm, and set 3b of coalescing filters further reduces the oil concentration to no more than approximately 10 ppm. The coalescing filters may be selected from those commercially available that are capable of processing pressurized hydrocarbon-containing fluids having temperature in the range of approximately 120° C.–160° C., and may be of the upflow type or the downflow type, or a combination of both types. Set 3a of filters may be identical to set 3b. Alternatively, a suitable hot deoiling unit 3 may be selected from those commercially available membrane filters. In another alternative embodiment, either or both of sets 3a and 3b may be replaced by a commercially available induced static gas flotation unit working under appropriate pressure. Suitable units of this type are manufactured by L'Eau Claire Systems Inc., of Louisiana.

In yet another embodiment a hydrocyclone may precede either an induced gas flotation unit or a set of coalescing filters to reduce gross amounts of oil.

The deoiled fluid emerging from hot deoiling unit 3 is softened in thermal softening unit 5. Thermal softening unit 5 will be described in detail below with reference to FIG. 2. Additional detail regarding variations on the design of thermal softening unit 5 is set forth in above-reference U.S. Pat. No. 4,518,505, which patent is incorporated herein by reference.

The softened, deoiled fluid emerging from thermal softening unit 5 is in liquid form and may be used for a variety of purposes, such as injection into a well for subterranean formation stimulation purposes. The temperature of the fluid output from unit 5 will typically be in the range 180°–210° C.

Figure 2:
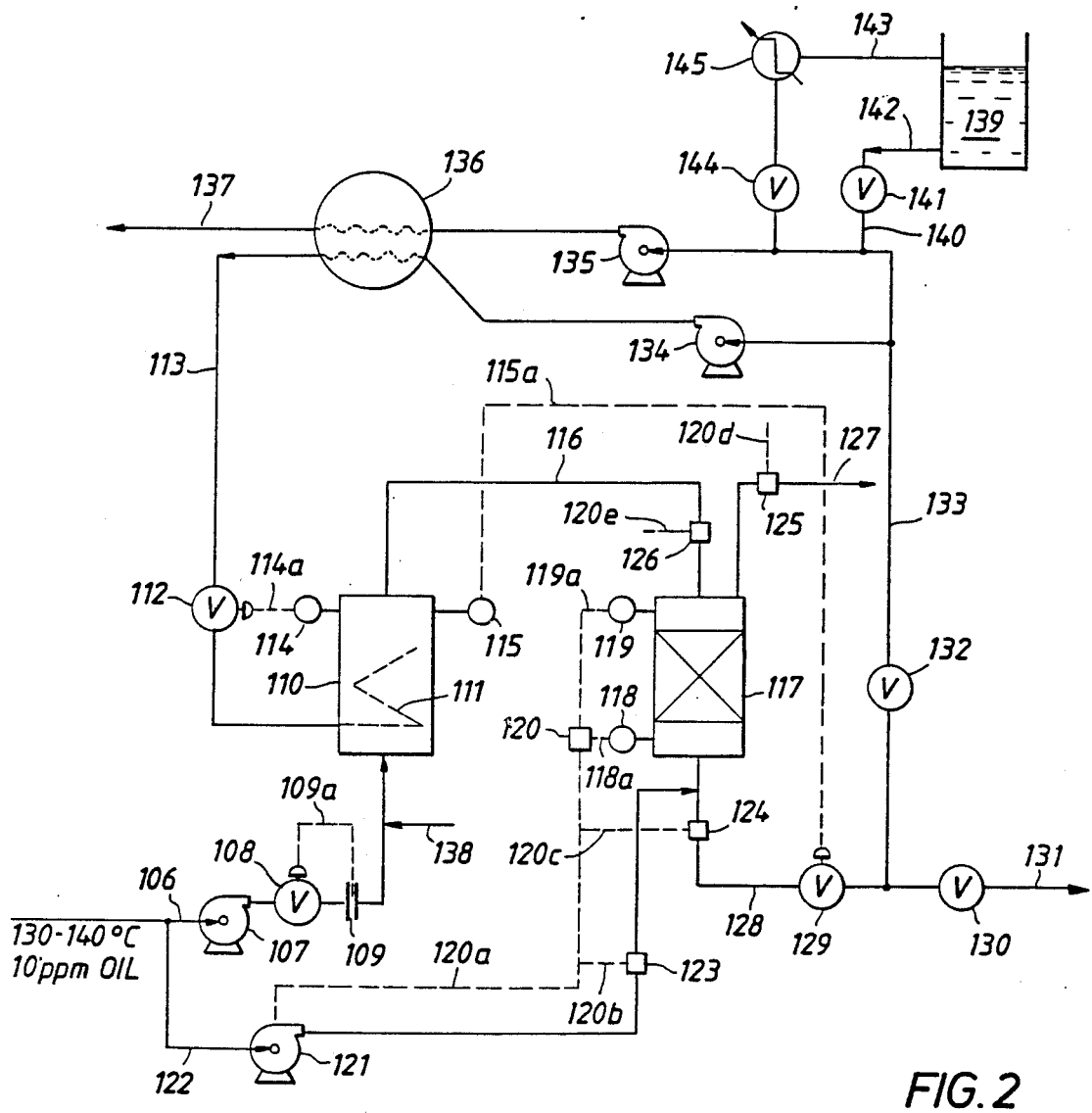
FIG. 2 is a schematic diagram of a preferred embodiment of thermal softening unit 5 of the FIG. 1 system.

FIG. 2 is a schematic diagram showing a preferred embodiment of thermal softening unit 5. The deoiled fluid (sometimes referred to below with reference to FIG. 2 as "feed water" or "produced water") emerging from hot deoiling unit 3 is pumped by pump 107 via line 106 to a suitable reaction zone 110 where it is heated by steam issuing from a sparger 111. Feed water is kept at a constant rate by a control valve 108 with signals from a flow sensor 109 supplied to control valve 108 via broken line 109a. In the embodiment shown feed water is introduced to reaction zone 110 from the bottom and withdrawn from the top. This flow configuration allows better utilization of the entire internal space of the vessel for reactions and requires no level control. It also reduces the gaseous $CO_2$ accumulation in the vessel.

Sparger 111 may be a perforated pipe coiled to cover a substantial volume of reaction vessel 110. The coiled pipe is perforated so that the steam is sparged downwardly into the water, thus avoiding plugging of the perforations by scale precipitates and ensuring good contact of the water by the steam.

Reaction vessel 110 is equipped with temperature and pressure sensors 114 and 115, respectively. The output from temperature sensor 114 controls through broken line 114a the actuator of a valve 112 located in the steam input line 113. Thus, in the embodiment illustrated, the steam flow to the sparger is controlled in response to temperature to maintain the temperature within the reaction vessel 110 at a desired level. It will be recognized of course that other suitable means for steam flow control can be utilized. For example, the steam input into the sparger can be controlled manually, in response to pressure, or in response to the input rate of the feed water, all by means which will be apparent to those of ordinary skill in the art.

Within vessel 110 the feedwater is heated to the desired temperature (which typically will be approximately 200° C.) and then withdrawn via line 116 and passed to a filtration unit 117 for removing solids therefrom. Filtration unit 117 may be of any suitable type, such as provided by one or more packed columns, screens, etc. A suitable filtration unit may comprise one or more cartridge filters made from porous metal membranes, and the retained precipitates may be backwashed by reducing the outlet pressure. One suitable filtration unit is manufactured by Pall Inc. As the water effluent is being filtered through one filter vessel, another filter vessel or vessels (not shown) can be backwashed to remove the precipitated scale.

The filtrate from filtration unit 117 is withdrawn via line 128 through a pressure controlled valve 129. In the embodiment shown a portion of the hot water may be permitted to flow into line 131 through valve 130 for subsequent processing or use, such as injection into a hot water injection well (not shown). A portion of the filter effluent flows through line 133 through valve 132 to boiler 136. Part of the steam produced within boiler 136 is withdrawn via line 137 (and may be applied to one or more injection wells) and the remainder is withdrawn via line 113 and employed in the sparging step. It will be appreciated that in a variation on the embodiment shown in FIG. 2, steam input line 113 may not be connected to boiler 136, but instead may be connected to some other independent steam source (not shown in FIG. 2). It is also within the scope of the invention for filtration unit 117 to be absent, so that fluid in line 116 will flow directly to line 128.

It is preferred in carrying out the invention to employ low pressure steam in the sparging step. To generate low pressure steam for this purpose, pump 134 delivers soft produced water through specially modified boiler economizer tubes at a discharge pressure between about 300 and 500 psi. These low pressure tubes should be independent of the other usual economizer tubes, which are normally operated at higher pressures, e.g., on the order of several thousand psi, the high pressure being maintained by the discharge pressure of the feed pump 135.

As described above, the pressure in reaction vessel 110 is maintained at a value above the steam saturation pressure at the temperature involved. It is also desirable to keep the temperature differential between the reaction zone output and the filtration unit at a minimum. For example, where the temperature of the water withdrawn from the reaction vessel is 200° C., the pressure may be maintained at a value of 300 psig. The decrease in temperature between the heating vessel and the filtration unit usually can be kept to a value of less than 10° C., with the pressure differential between the heating vessel and the filtration unit normally falling within the range of 5–30 psi. Preferably, the filtering step is carried out at a pressure which is greater than the water vapor pressure corresponding to the temperature in the reaction vessel to prevent boiling.

The desired pressure in the heating vessel 110 can be maintained by pressure sensors 115 which applies signals as indicated by broken lines 115a to the controller for valve 129. The controller responds to produce a control function to regulate the effluent from filtration unit 117 by valve 129 to maintain the desired pressure in unit 110. It will be recognized that other suitable means may be employed to regulate the fluid flow from reaction zone 110. For example, valve 129 may be operated solely in response to the pressure in the filtration effluent line without regard to pressure within vessel 110 or it may be operated in response to the pressure at the input to the filtration unit.

The filtration unit is taken out of service for backwash once the differential pressure reaches a certain value, usually 30 psig. For this purpose, pressure sensors 118 and 119 measure the pressure gradient across the filtration unit 117 and send signals through the broken lines 118a and 119a respectively to controller 120. When the pressure differential reaches the preset value, e.g. 30 psig, the controller will trigger a backwash on the filtration unit 117. Such systems for alternate filtering and backwashing are well known in the art and no further description need be provided. Water for the backwash, may be taken from the stream of deoiled fluid emerging from unit 3 via line 122, and disposed of through line 127. Alternatively, water for backwash may be taken from an independent supply (not shown) to which line 122 is attached. It is recognized that other backwash schemes can also be applied; e.g., a portion of the soft produced water from other filtration units in service could be used to flush the unit taken offline for backwash. In that case, no backwash pump would be necessary, as the pressure of the soft produced water is believed sufficiently high to backwash the filter medium.

A certain amount of soft water is required initially to produce steam by boiler 136 and to start up the softening process. Such soft water is stored in tank 139 and withdrawn as needed through line 142, check valve 141, and line 140 for use in the start-up process.

Once the boiler and the softening process are in steady operation, the inventory of tank 139 can be replenished by taking a portion of soft water from the filtration unit 117 to tank 139 through line 143, valve 144 and cooler 145 which cools the soft water to prevent vaporization from taking place once the water pressure is relieved to atmospheric pressure in tank 139. Alternatively, this tank may be pressurized, and the tank may be either in-line or off-line as desired.

It is understood that the flue gas leaving the economizer of boiler 136 is substantially hotter than the boiler feed water temperature, i.e. 200° C., and carries with it a certain amount of waste heat. To increase the boiler efficiency, it is desirable to cool the flue gas to 100°–150° C. range by using it to preheat the boiler combustion air with an air heater not shown in FIG. 2. Heating the air before the combustion will reduce boiler fuel consumption and make the process very energy efficient.

The relative amounts of feed water and sparging steam applied to reaction vessel 110 will vary depending upon the feed water temperature and the desired effluent temperature as well as the steam temperature and quality. As a practical matter, the feed water rate to the reaction zone usually will be about 2.5 times the steam flow rate on a weight basis.

It is sometimes desirable to add a base and magnesium compound to the feed water. These chemicals can be added to the feed water stream via line 138.

Inlet separator 10, heat exchangers 13–16, and water removal units 11 and 12, shown in FIG. 1, may be selected from suitable commercially available units. The portion of the FIG. 1 system including separator 10, heat exchangers 13–16, water removal units 11 and 12, and the fluid flow lines connected thereto may be collectively referred to as hydrocarbon separation subsystem 19. It is specifically contemplated that other techniques of hydrocarbon separation besides that described above may be performed preliminary to processing in hot deoiling unit 3. Indeed, it is not an essential feature of the invention that a subsystem 19 be provided. Rather, it is also within the scope of the invention to treat produced hydrocarbon-containing fluids having temperature in the approximate range 120° C.–160° C. using only hot deoiling unit 3 and thermal processing unit 5. Any of the above-described embodiments of hot deoiling unit 3 and thermal processing unit 5 may be employed.

In addition to the bitumen-containing emulsion described above with reference to FIG. 1, examples of produced fluids that may be processed in accordance with the inventive technique include emulsions of water and heavy oil with an API gravity in the range from 9° to 20°.

The above description is merely illustrative of the invention. It is contemplated that various changes in the details of the structures and methods described may be within the scope of the invention as defined by the appended claims.

We claim:

1. A method for treating a hot produced hydrocarbon-containing fluid comprising the steps of:
    (a) flowing the hot produced fluid, without substantial removal of heat, to an inlet separator;
    (b) separating the hot produced fluid in the inlet separator into a predominantly gaseous portion, a predominantly liquid hydrocarbon portion, and a predominantly liquid water portion;
    (c) flowing the predominantly liquid water portion, without substantial removal of heat, to a hot deoiling unit;
    (d) reducing the oil concentration of the predominantly liquid water portion in the hot deoiling unit to a level appropriate for processing in a thermal softening unit, thereby deoiling the predominantly liquid water portion; and
    (e) softening the deoiled liquid water portion in a thermal softening unit.

2. The method of claim 1 wherein the predominantly liquid water portion of step (b) has a temperature within the range of approximately 120° C. to approximately 160° C.

3. The method of claim 2 wherein the deoiled liquid water portion of step (d) has a temperature within the range of approximately 120° C. to approximately 160° C.

4. A method for treating a hot produced hydrocarbon-containing fluid comprising the steps of:
    (a) flowing the hot produced fluid, without substantial removal of heat, into an inlet separator;
    (b) separating the hot produced fluid in the inlet separator into a first, predominantly gaseous portion; a second portion consisting predominantly of liquid hydrocarbon; and a third portion consisting predominantly of liquid water;
    (c) separating the second portion into a fourth portion consisting predominantly of liquid hydrocarbon and a fifth portion consisting predominantly of liquid water;
    (d) combining the fifth portion with the third portion to produce a combined portion having a temperature within the range of approximately 120° C. to approximately 160° C. and oil concentration within the range of approximately 1% to approximately 5%;
    (e) flowing the combined portion, without substantial removal of heat, to a hot deoiling unit;
    (f) reducing the oil concentration of the combined portion in the hot deoiling unit to a level appropriate for processing in a thermal softening unit, thereby deoiling the predominantly liquid water portion, wherein the deoiled combined portion has a temperature within the range of approximately 120° C. to approximately 160° C.; and
    (g) softening the deoiled combined portion in a thermal softening unit wherein the softened, deoiled combined portion has a temperature within the range of approximately 180° C. to approximately 210° C.

5. The method of claim 4 further comprising the step of (h) maintaining sufficient pressure on the hot produced fluid to maintain the liquid portions thereof in liquid form by operating at suitable high pressure during performance of all steps.

6. The method of claim 4 wherein the hot produced fluid is an emulsion including heavy oil with API gravity in the range from about 9° to 20°.

7. The method of claim 4 wherein the hot produced fluid is an emulsion of bitumen and water produced as a result of a thermal process applied to a subterranean formation.

8. The method of claim 4, further comprising the steps of:
   (h) filtering scale from the softened, deoiled combined portion wherein the filtered, softened, deoiled combined portion has a temperature within the range of approximately 180° C. to approximately 210° C.; and
   (i) heating a portion of the filtered, softened, deoiled combined portion to generate steam;

9. The method of claim 4 wherein the hot deoiling unit comprises two sets of coalescing filters.

10. The method of claim 8 wherein the oil concentration of the combined portion is reduced by flowing the combined portion through a first set of coalescing filters and next through a second set of coalescing filters.

11. A method for treating a hot produced hydrocarbon-containing fluid comprising the steps of:
   (a) flowing the hot produced fluid, without substantial removal of heat, to an inlet separator;
   (b) separating the hot produced fluid in the inlet separator into a first, predominantly gaseous portion; a second portion consisting predominantly of liquid hydrocarbon; and a third portion consisting predominantly of liquid water having an oil concentration within the range of approximately 1% to approximately 5%;
   (c) cooling the second portion to about 110° C.;
   (d) separating the second portion into a fourth portion consisting predominantly of liquid hydrocarbon and a fifth portion consisting predominantly of liquid water having an oil concentration within the range of approximately 1% to approximately 5%;
   (e) combining the fifth portion with the third portion to produce a combined portion having a temperature within the range of approximately 120° C. to approximately 160° C. and an oil concentration within the range of approximately 1% to approximately 5%.
   (f) flowing the combined portion, without substantial removal of heat, to a hot deoiling unit;
   (g) reducing the oil concentration of the combined portion in the hot deoiling unit to a level appropriate for processing in a thermal softening unit, thereby deoiling the predominantly liquid water portion, wherein the deoiled combined portion has a temperature within the range of approximately 120° C. to approximately 160° C.;
   (h) flowing the deoiled combined portion, without substantial removal of heat, to a reaction zone;
   (i) heating, within the reaction zone, the deoiled combined portion by sparging with steam to a temperature within the range of approximately 150° C. to approximately 250° C. to facilitate softening of the deoiled combined portion;
   (j) withdrawing the softened, deoiled combined portion from the reaction zone;
   (k) flowing the softened, deoiled combined portion to a filtration unit, without substantial removal of heat; and
   (l) filtering scale from the softened, deoiled, combined portion in the filtration unit;

12. The method of claim 11, further comprising the steps of:
   (m) heating a portion of the filtered, softened, deoiled combined portion to produce steam; and
   (n) utilizing the steam in the heating step (i).

13. The method of claim 11 wherein the hot deoiling unit comprises:
   a first set of coalescing filters capable of reducing the oil concentration of the fluid to no more than approximately 50–100 ppm; and
   a second set of coalescing filters connected downstream from the first set, capable of further reducing the oil concentration of the fluid.

* * * * *